(12) United States Patent
Chaganti

(10) Patent No.: US 10,445,695 B2
(45) Date of Patent: Oct. 15, 2019

(54) METHOD AND SYSTEM FOR PROVIDING CONTINUOUS REFERENCE ARCHITECTURE AND BILL OF MATERIAL MODELING

(71) Applicant: Dell Products L.P., Round Rock, TX (US)

(72) Inventor: Ravikanth Chaganti, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 756 days.

(21) Appl. No.: 14/846,375

(22) Filed: Sep. 4, 2015

(65) Prior Publication Data

US 2017/0068931 A1 Mar. 9, 2017

(51) Int. Cl.
*A01K 5/02* (2006.01)
*G06Q 10/08* (2012.01)

(52) U.S. Cl.
CPC .............. *G06Q 10/0875* (2013.01)

(58) Field of Classification Search
CPC .................................. G06Q 10/0875
USPC ........................................ 705/16, 29
See application file for complete search history.

(56) References Cited

U.S. PATENT DOCUMENTS

| 2007/0073679 A1* | 3/2007 | Fu ............................. G06Q 10/06 |
| 2007/0192466 A1* | 8/2007 | Nahum .................. G06F 9/4416 709/223 |
| 2015/0026189 A1* | 1/2015 | Li ........................ G06F 16/2228 707/741 |

FOREIGN PATENT DOCUMENTS

WO    WO 2013/163636    * 10/2013

* cited by examiner

*Primary Examiner* — Rokib Masud
(74) *Attorney, Agent, or Firm* — Jackson Walker LLP; Christopher J. Rourk; Thomas B. Hayes

(57) ABSTRACT

A method for generating bill of material data for complex systems comprising storing a plurality of electronic documents in a standardized format using an electronic data storage device, where each electronic document has an associated solution identifier data field and one or more associated bill of materials data fields. Receiving a query request over a data network in an electronic data format that includes a query solution identifier data field. Extracting electronic data documents having a matching data field value to the solution identifier data field. Extracting the bill of materials data fields for each electronic document using data processing equipment. Assembling a compilation of the bill of materials data fields from each of the extracted electronic data documents.

17 Claims, 2 Drawing Sheets

METHOD AND SYSTEM FOR PROVIDING CONTINUOUS REFERENCE ARCHITECTURE AND BILL OF MATERIAL MODELING

TECHNICAL FIELD

The present disclosure relates generally to a workload reference architecture, and more specifically to a workload reference architecture that provides continuous reference architecture and bill of material modeling for complex systems.

BACKGROUND OF THE INVENTION

Enterprise solutions include the generation of technical papers such as reference architectures (RA), performance sizing papers, blue prints for various infrastructure and workloads and so on. These are published at various places.

SUMMARY OF THE INVENTION

A method for generating bill of material data for complex systems is provided that includes storing a plurality of electronic documents in a standardized format using an electronic data storage device, where each electronic document has an associated solution identifier data field and one or more associated bill of materials data fields. A query request is received over a data network in an electronic data format that includes a query solution identifier data field. Electronic data documents having a matching data field value to the solution identifier data field are then extracted, and the bill of materials data fields for each electronic document is then extracted, using data processing equipment. A compilation of the bill of materials data fields is assembled from each of the extracted electronic data documents.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
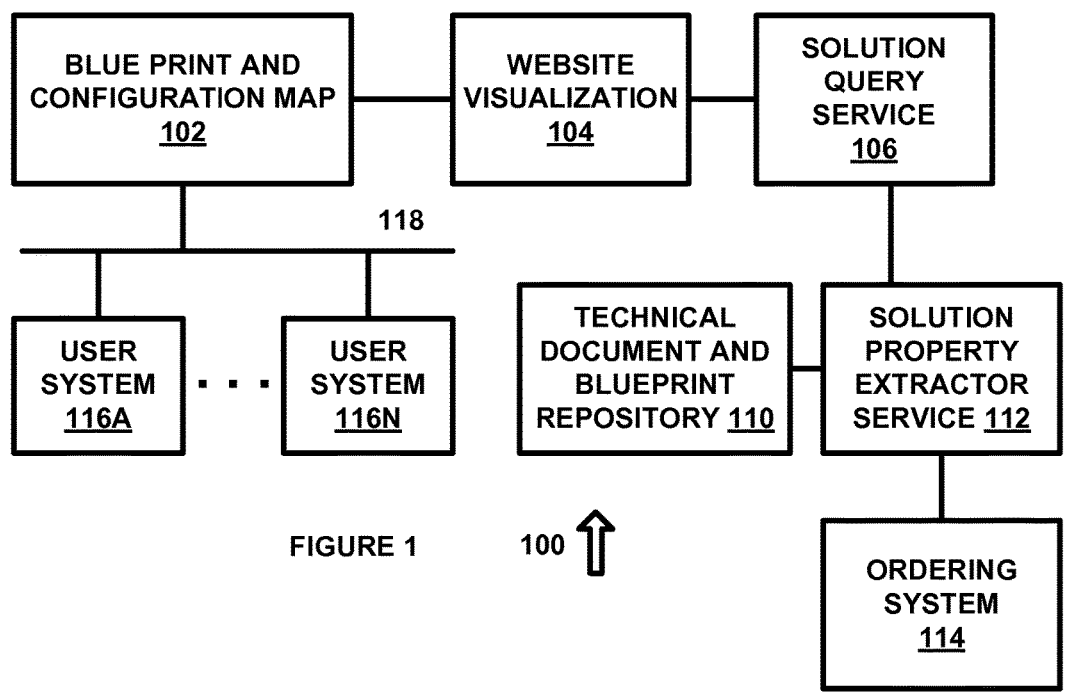
FIG. 1 is a diagram of a system for continuous reference architecture and bill of material modeling, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

Complex data processing systems, telecommunications systems, security systems, monitoring systems, emergency systems, transportation data systems, or other multiple component systems are typically custom-designed for a specific application by designers, assembled and installed by skilled installation personnel, and operated by technically-skilled customers. Solution advisor tools allow customers to generate workload solution architecture recommendations for such complex systems based on a few responses to workload-related questions for the complex system. These advisor tools require a significant amount of backend data that is used in determining the right solution configuration for the customer requirements. The creation of the backend data is typically performed using lab studies to create a reference architecture paper or system blueprint, and is a tedious process. These solution advisor tools provide accurate recommendations for workloads but are not proactive and are not integrated with product selection methods.

Keyword mapping to collateral reference architecture documents or blueprints can also be used to search for server and storage products, but this approach is error-prone. Any human error in mapping keywords to each product can lead to showing wrong blueprints or reference architecture recommendations for that product. In addition, any updates to the blueprints or reference architecture configurations cannot be accurately shown to customers unless the mappings are redone. As such, keyword mapping is not a scalable method.

Internet advertisements such as Google Adwords™ use a backend infrastructure to map keywords to ad blocks that can be displayed on a client device, based on the keywords found on the web pages and/or target applications. This process is not any different from manual mapping of the keywords. Furthermore, each ad block contains an expiry configuration after which the advertisement never gets displayed on the client devices, which is not an integrated approach where the reference architecture papers or blueprints themselves carry the required information for mapping.

The ability to provide blueprints and reference architecture recommendations is important to businesses, because many products and services (such as server platforms, enterprise software, telecommunications systems, computer systems and so forth) are recommended for use in specific application workload scenarios. For example, a first server can be recommended as a building block for running an enterprise software system and a second server can be recommended for virtualization. These recommendations can be provided by blueprints and reference architecture documents that are developed by a first team. A similar approach can also exist for storage devices, but the workloads that have been verified and recommended on a specific hardware or a specific configuration of the hardware might be difficult to find by selecting a server or storage platform.

While mapping by tagging documents with server models, software solutions and so forth allows a customer to search for a server model and then filter from there to reach to a specific workload solution, that process represents manual work that might not be implemented properly by a prospective customer, and if an author of a document fails to add the proper keywords to search tool, that document will not show up in a search for a specific application or system.

The present disclosure relates to a system and method for associating blueprints, reference architecture documents and other technical documents with associated components and services. The present disclosure allows a customer to see relevant recommendations as they build a specific hardware configuration, after which they can use the recommendation to generate a complete Bill-Of-Material (BOM) for the solution, or use a reference to identify a technical services representative for help with further customizing the hardware to suit their needs. The desired level of recommendations can be shown on a product selection web page. A first area of the web page can show a link to a blueprint, reference architecture or other document, and a second area can provide a link to a solution identifier that can be provided to a solution configurator, and customized further. Eventually, the customer can order the solution on their own, by sending the customized configuration to a technical services representative or in other suitable manners. The customer can filter these proactive recommendations for a specific workload and/or where the solution pricing is low to high or vice versa and/or the most popular solutions either determined by number of hits to the documents, by the most references in the ordering system, or in other suitable manners.

The present disclosure uses technical paper and blueprint documents to enable solution selling without the need to map keywords or otherwise keep track of platform to solution architectures, such as by using a standard document format for blueprints and other technical documents, such as Open Office XML (OOXML) format.

FIG. 1 is a diagram of a system 100 for continuous reference architecture and bill of material modeling, in accordance with an exemplary embodiment of the present disclosure. System 100 includes blueprint map and configuration map 102, website visualization 104, solution query service 106, technical document and blueprint repository 110, solution property extractor service 112, ordering system 114, user systems 116A through 116N and network 118, each of which can be implemented in hardware or a suitable combination of hardware and software.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and" or "or" includes any and all combinations of one or more of the associated listed items, unless the context clearly indicates otherwise.

Blueprint map and configuration map 102 interfaces with user systems 116A through 116N over network 118 to allow operators of user systems 116A through 116N to access reference architecture materials, blueprint materials and other suitable materials for identifying components of complex systems, for configuring the systems and components, for ordering the systems and components and for other suitable purposes. An operator of user systems 116A through 116N can access blueprint map and configuration map 102 and receive data using an Internet browser (such as in a Java or HTML format), using a thin client application or in other suitable manners. User systems 116A through 116N can be desktop computers, laptop computers, notebook computers, tablet computers, handheld computing devices such as smart phones, or other suitable systems or components.

Website visualization 104 provides a visualization service that receives queries for the related solution reference architecture papers, blueprints and other related source materials, and prepares website visual elements that can be used to convey those materials. In one exemplary embodiment, the user can enter a query and a user interface can be generated that includes a number of functional controls, including:

1) one or more links to reference architecture papers, blueprints or other documents that are associated with the query. For each document where the target platform is a solution component, the link can be generated with a summary of the document, a hypertext or other suitable link to the document that describes the reference architecture or the blueprint, and other suitable material, and which can be included as a part of the JSON response received from solution query service 106 or other suitable systems or components.

2) one or more links to a solution configurator, such as to obtain information on service provides that can assist with implementing the associated equipment, and to customize the associated equipment as needed.

3) one or more controls to allow the user to filter results, such as by using a filter for a specific workload, a specific price point, a most popular system configuration sold that is associated with a reference architecture, blueprint or other suitable document.

Technical document and blueprint repository 110 can be implemented as one or more software systems operating on a suitably configured processor platform, such as an Open Office XML compliant (OOXML) document repository or other suitable systems. Technical document and blueprint repository can utilize a standard format for creating documents such as Word documents, Excel spreadsheets, PowerPoint presentations or any other suitable document processors or viewers that support documents written in the standard format. In one exemplary embodiment, technical documents can be written in the standard format, can be converted into a document that supports the standard format or other suitable processes can also or alternatively be used.

The selected standard can include documents written and packaged using the Open Packaging Convention (OPC), can be containers that represent the contents of the documents as set of XML files, can be a .ZIP file that requires an extractor to look at the contents, or can be other suitable systems or processes. For example, a reference architecture paper can be stored as an OPC package that uses the WordprocessingML specification. The contents of the document can be stored as a document.xml file in a folder. The XML can be parsed to read the contents of the document, such as table cells and other word content. Also or alternatively, a Software Development Kit (SDK) can be used for reading the document contents without a word processing or viewing application. All documents in technical document and blueprint repository 110 can use the following exemplary format and solution component specification written in a standard table format as shown in the following table:

| COMPONENT | DETAILS |
| --- | --- |
| Solution Identifier | Unique solution identifier |
| Virtualization Infrastructure | List of processors, communications components, |
| Virtualization Hosts | List of processor, memory, communications, operating system |
| Storage arrays | Data storage devices |
| Networking | Networking equipment |
| Configuration Identifier | Unique configuration identifier |

Solution property extractor service 112 can be configured to extract solution identifier details from each standards-compliant document and to interface with solution query service 106, which can store the standards-compliant document in a lightweight data interchange format, such as the Javascript Object Notation (JSON), in a format stored in a relational database (such as an SQL database), a non-relational database (such as a non-SQL database) or in other suitable manners. The format of the solution specification as shown in the table makes it easy to read and generate the bill-of-material (BOM) for the solution. The table contains the solution ID that can be used directly with an interface to an ordering system 114 to generate the bill-of-material.

In one exemplary embodiment, an XML representation of the sample table in the OOXML package is shown below:

```
<wItcPr›
<w:tcW wity="2970" iwtype=."dxa"/>
</w:tcPr>
<wlp w14:paraId.-."47D466E9' w14tex-Ud.--1D193F32'
    licrsidR="GBD42EF9" wrsidRDefault"na42EF9' licrsidP.-
    ."0.0.4C5C6D'›<tcpPr)OcriStyle wlval-."TableCell"/>
</wpr> <w:r)
<Wt>$01ution ID</w:t>mcr> </win.
</w:tc>
‹w:tc›
<w:tcPr>
‹w:tclq w1.46=."15540" iwtype"dxa"/
<wEridSpan W1Val="2'/)
</w:tcPr>
<W:p w14:paraid"3A7CC11A' ..2114textIdN"4E5,988Er
    w;r5idRP"G00,42EF9" wrSidnefault=."DQ042EF9' vt:r5i0"0.0,4
    C5C6D")- <wpr) OrriStyle wval="jahleCell",›
</w:pr>
</w:r>
</w:>54121564</wt>
```

The XML can be parsed by solution property extractor service 112 or in other suitable manners.

Solution property extractor service 112 can use a standards-related interface, such as an OOXML interface or other suitable interface, to read blueprints, technical papers or other suitable documents, and to extract a component specification into a complete bill-of-material. In one exemplary embodiment, solution property extractor service 112 can use a solution identifier that is retrieved from the standards-compatible documents to build the bill-of-material for the solution, either alone or in conjunction with data received from ordering system 114. By using ordering system 114, the solution bill-of-material can be kept up to date, and any end-of-life (EOL) components in the predefined solution identifier can be detected and flagged for a change or removal. Once solution property extractor service 112 retrieves the completed bill of materials for a given solution, it interfaces with solution query service 106 to transform the solution data and bill of materials data to a suitable format, such as the JSON format.

In operation, system 100 allows a user to research and order complex systems, by providing the user with reference architectures, blueprints, technical documents, bills of material or other suitable data that is needed for the user to identify, configure and order the individual components required for a complex system. System 100 assembles the relevant technical documents in a data structure having a standardized format, to allow new documents to be added to the data structure and to be readily located by a person that is researching a complex system that is relevant to the new documents.

Figure 2:
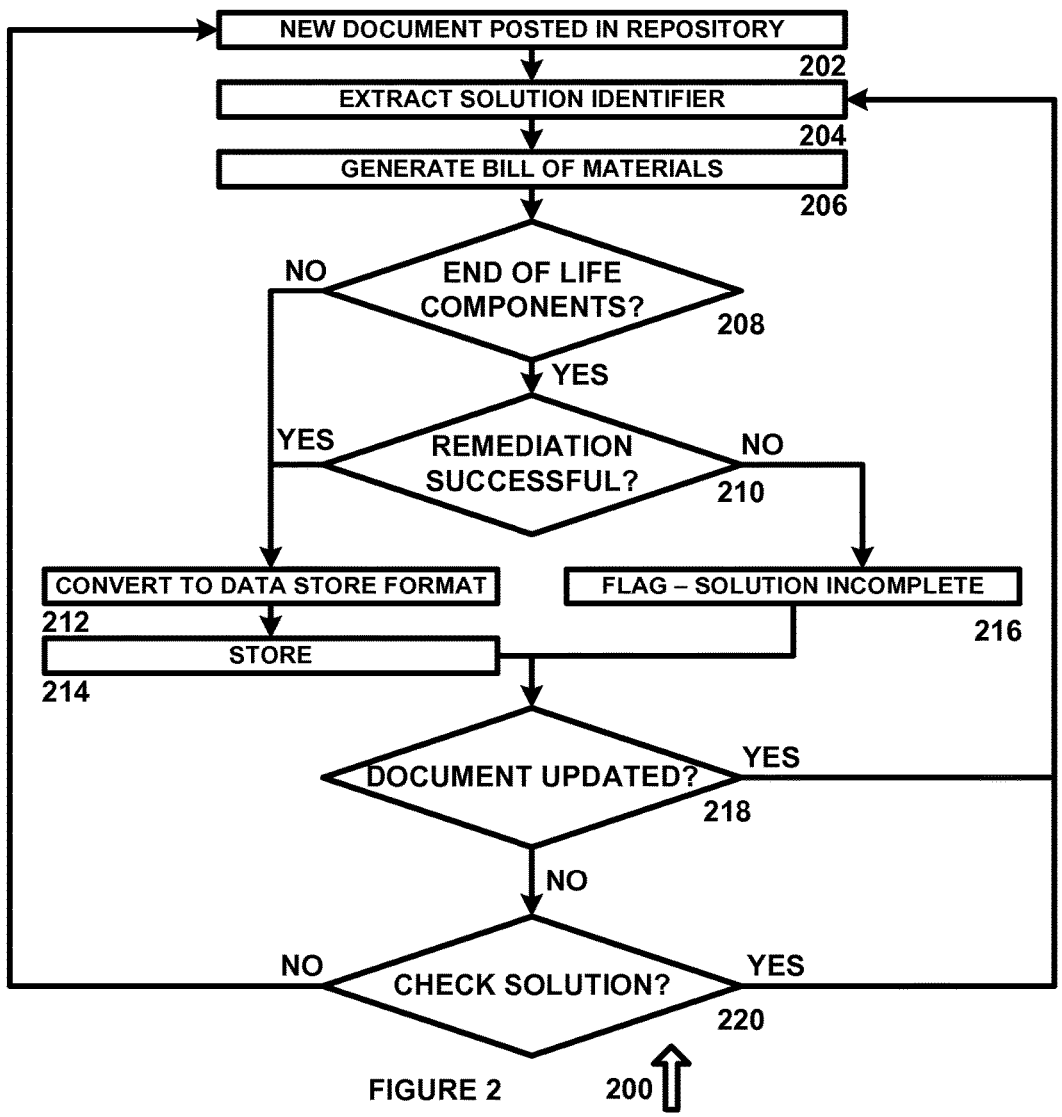
FIG. 2 is a diagram of an algorithm for continuous reference architecture and bill of material modeling, in accordance with an exemplary embodiment of the present disclosure.

FIG. 2 is a diagram of an algorithm 200 for continuous reference architecture and bill of material modeling, in accordance with an exemplary embodiment of the present disclosure. Algorithm 200 can be implemented in hardware or a suitable combination of hardware and software.

Algorithm 200 begins at 202, where a new document is added to a document repository. In one exemplary embodiment, the document can be a reference architecture document, a blueprint document or other suitable documents, and can be added to a standards-compliant data structure, such as an OOXML database. The algorithm then proceeds to 204.

At 204, the document is extracted from the standards-compliant data structure, and a solution identifier is extracted from the document. The algorithm then proceeds to 206.

At 206, the solution identified is used to obtain a bill of materials. The algorithm then proceeds to 208, where it is determined whether there are any end-of-life components in the bill of materials, such as components that are at the end of a product offering cycle and which are being phased out from the product offerings. If no end-of-life components are present, the algorithm proceeds to 212. If an end-of-life component is present, the algorithm proceeds to 210.

At 210, a remediation policy is applied for the end of life components to find replacement components. If it is determined that a replacement component cannot be found, the algorithm proceeds to 216, where the solution is flagged as having an incomplete bill-of-material, and the algorithm proceeds to 218. Otherwise, if the remediation policy is successful, the algorithm proceeds to 212.

At 212, the information is converted to a data store format and displayed. A solution with end of life components gets a lower ranking compared to solutions with shipping components, but still gets shown in the results for an end user.

In one exemplary embodiment, a solution extractor can be used that includes all solution components and their associated stock keeping unit (SKU) data in a format for data storage, such as JSON. The data storage format document for a specific solution can also contain information about how many times a reference architecture paper, blueprint associated with the solution or other associated document was viewed or downloaded. The metric for number of views can be used to determine the popularity of the solution blueprint, reference architecture document or other document. The storage format data can also contain pricing data, such as for use in conjunction with a filter.

At 218, it is determined whether the document has been updated within a predetermined time interval, such as once every month. If the document has not been updated, the algorithm proceeds to 220, otherwise the algorithm returns to 204.

At 220, the solution associated with the document is checked to determine whether the documents, components, solutions or other related data requires additional updating. If a new document is required, the document is updated and the algorithm returns to 202, otherwise the algorithm returns to 204.

In operation, algorithm 200 allows a user to receive solution-related reference architecture data, blueprint data or other suitable data for a complex system, where the currency of the individual components for the solution is determined and used to identify solution data that requires updating.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for generating bill of material data for complex systems comprising:
    storing a plurality of electronic documents in a standardized format using an electronic data storage device, where each electronic document has an associated unique solution identifier data field and one or more associated bill of materials data fields;
    receiving a query request over a data network in an electronic data format that includes a query solution identifier data field;
    extracting electronic data documents having a matching data field value to the solution identifier data field;
    extracting the bill of materials data fields for each electronic document using data processing equipment;
    assembling a compilation of the bill of materials data fields from each of the extracted electronic data documents;
    determining whether an end of life component is included in the bill of materials data as a function of product offering cycle data for the component; and
    implementing a remediation policy in response to the end of life component to identify a replacement component that is compatible with the solution.

2. The method of claim 1 wherein storing the plurality of electronic documents in the standardized format using the electronic data storage device, where each electronic document has the associated unique solution identifier data field and one or more associated bill of materials data fields comprises storing the plurality of electronic documents in an Open Packaging Convention format using the electronic data storage device, where each electronic document has the associated solution identifier data field and one or more associated bill of materials data fields.

3. The method of claim 1 wherein receiving the query request over the data network in the electronic data format that includes the query solution identifier data field comprises receiving the query request over the data network in a Javascript Object Notation format that includes the query solution identifier data field.

4. The method of claim 1 wherein extracting the electronic data documents having the matching data field value to the solution identifier data field comprises accessing one or more data records storing stock keeping unit data.

5. The method of claim 1 wherein extracting the bill of materials data fields for each electronic document using the data processing equipment comprises accessing one or more data records of an inventory system.

6. The method of claim 1 wherein assembling the compilation of the bill of materials data fields from each of the extracted electronic data documents comprises assembling the compilation of the bill of materials data fields from each of the extracted electronic data documents in a data structure having a standardized format.

7. The method of claim 1 wherein storing the plurality of electronic documents in the standardized format using the electronic data storage device comprises:
    receiving a new electronic document; and
    extracting a solution identifier from the new electronic document.

8. The method of claim 1 wherein storing the plural of electronic documents in the standardized format using the electronic data storage device comprises:
    receiving a new electronic document;
    extracting a solution identifier from the new electronic document; and
    generating bill of materials data for the new electronic document.

9. The method of claim 1 wherein storing the plurality of electronic documents in the standardized format using the electronic data storage device comprises:
    receiving a new electronic document;
    extracting a solution identifier from the new electronic document;
    generating bill of materials data for the new electronic document; and
    determining whether there are any end of life components in the bill of materials.

10. The method of claim 1 wherein storing the plurality of electronic documents in the standardized format using the electronic data storage device comprises:
    receiving a new electronic document;
    extracting a solution identifier from the new electronic document;
    generating bill of materials data for the new electronic document;
    determining whether there are any end of life components in the bill of materials; and
    determining whether a remediation policy can be applied to the end of life components in the bill of materials.

11. The method of claim 1 wherein storing the plurality of electronic documents in the standardized format using the electronic data storage device comprises:
    receiving a new electronic document;
    extracting a solution identifier from the new electronic document;
    generating bill of materials data for the new electronic document;

determining whether there are any end of life components in the bill of materials;
determining whether a remediation policy can be applied to the end of life components in the bill of materials; and
generating a flag if it is determined that the remediation policy cannot be applied to the end of components in the bill of materials.

12. The method of claim 1 wherein storing the plurality of electronic documents in the standardized format using the electronic data storage device comprises:
receiving a new electronic document;
extracting a solution identifier from the new electronic document;
generating bill of materials data for the new electronic document;
determining whether there are any end of life components in the bill of materials;
determining whether a remediation policy can be applied to the end of life components in the bill of materials; and
converting the document to a data store format.

13. The method of claim 1 wherein storing the plurality of electronic documents in the standardized format using the electronic data storage device comprises:
receiving a new electronic document;
extracting a solution identifier from the new electronic document;
generating bill of materials data for the new electronic document;
determining whether there are any end of life components in the bill of materials;
determining whether a remediation policy can be applied to the end of life components in the bill of materials;
converting the document to a data store format; and
determining whether the document has been updated.

14. The method of claim 13 further comprising extracting a solution identifier from the document if the document has been updated.

15. The method of claim 1 wherein storing the plurality of electronic documents in the standardized format using the electronic data storage device comprises:
receiving an updated electronic document;
extracting a solution identifier from the updated electronic document;
generating bill of materials data for the updated electronic document;
determining whether there are any end of life components in the bill of materials;
determining whether a remediation policy can be applied to the end of life components in the bill of materials; and
converting the document to a data store format.

16. The method of claim 1 wherein storing the plurality of electronic documents in the standardized format using the electronic data storage device comprises:
receiving an updated electronic document;
extracting a solution identifier from the updated electronic document;
generating bill of materials data for the updated electronic document using an ordering system;
determining whether there are any end of life components in the bill of materials; and
converting the document to a data store format if it is determined that there are no end of life components.

17. A method for generating bill of material data for complex systems comprising:

storing a plurality of electronic documents in a standardized format using an electronic data storage device, where each electronic document has an associated unique solution identifier data field and one or more associated bill of materials data fields;
receiving a query request over a data network in an electronic data format that includes a query solution identifier data field;
extracting electronic data documents having a matching data field value to the solution identifier data field;
extracting the bill of materials data fields for each electronic document using data processing equipment;
assembling a compilation of the bill of materials data fields from each of the extracted electronic data documents;
wherein extracting the bill of materials data fields for each electronic document further comprises:
  determining whether an end of life component is included in the bill of materials data as a function of product offering cycle data for the component; and
  implementing a remediation policy in response to the end of life component to identify a replacement component that is compatible with the solution;
wherein storing the plurality of electronic documents in the standardized format using the electronic data storage device, where each electronic document has the associated solution identifier data field and one or more associated bill of materials data fields comprises storing the plurality of electronic documents in an Open Packaging Convention format using the electronic data storage device, where each electronic document has the associated solution identifier data field and one or more associated bill of materials data fields;
wherein receiving the query request over the data network in the electronic data format that includes the query solution identifier data field comprises receiving the query request over the data network in a Javascript Object Notation format that includes the query solution identifier data field;
wherein extracting the electronic data documents having the matching data field value to the solution identifier data field comprises accessing one or more data records storing stock keeping unit data;
wherein extracting the bill of materials data fields for each electronic document using the data processing equipment comprises accessing one or more data records of an inventory system;
wherein assembling the compilation of the bill of materials data fields from each of the extracted electronic data documents comprises assembling the compilation of the bill of materials data fields from each of the extracted electronic data documents in a data structure having a standardized format;
receiving a new electronic document;
extracting a solution identifier from the new electronic document;
generating bill of materials data for the new electronic document;
determining whether there are any end of life components in the bill of materials;
determining whether a remediation policy can be applied to the end of life components in the bill of materials; and
generating a flag if it determined that the remediation policy cannot be applied to the end of life components in the bill of materials.

* * * * *